INVENTORS
Frederick T. Sonne,
Elmer J. Bury,
By Wilkinson, Huxley, Byron, & Hume
Attys.

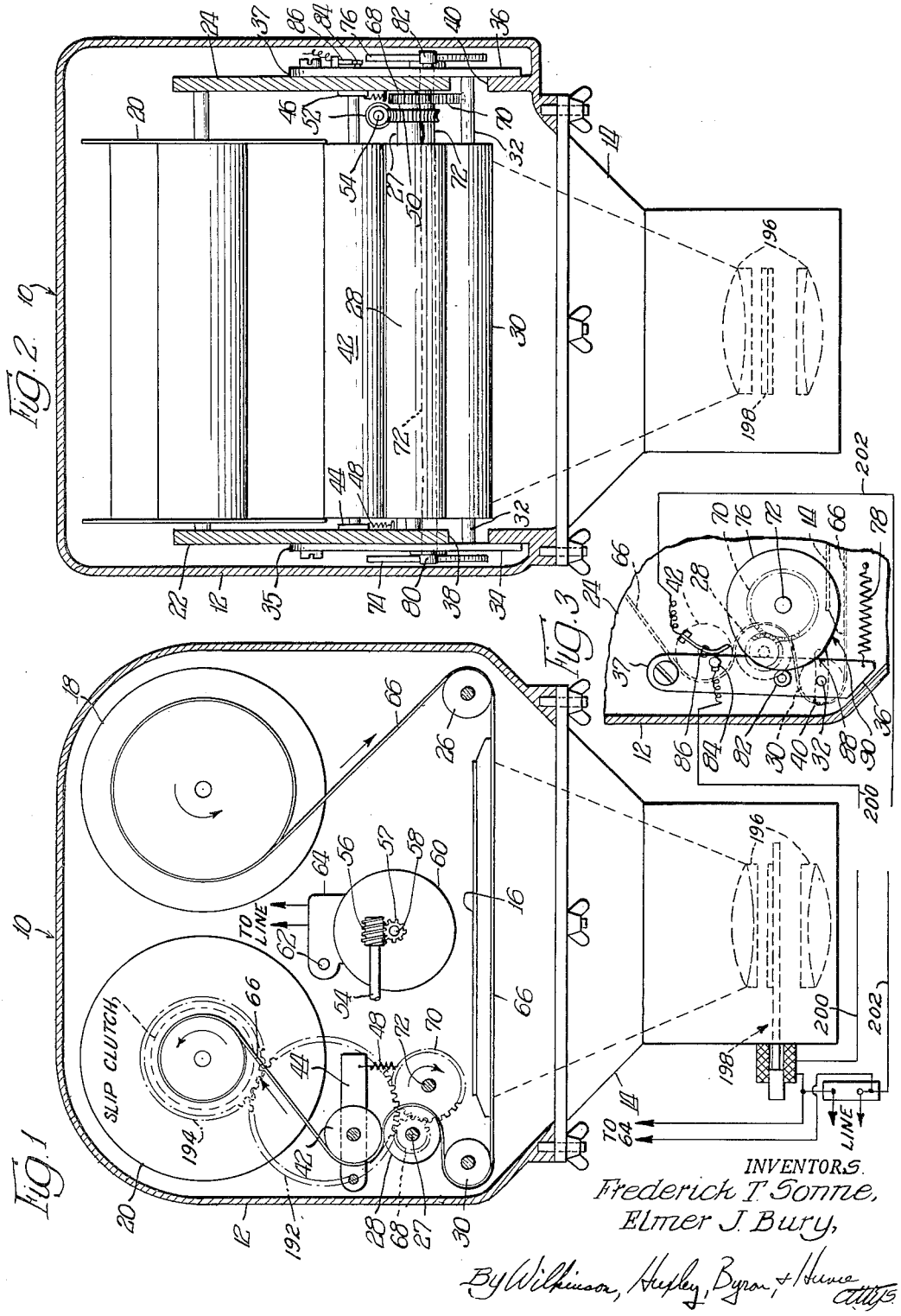

United States Patent Office 2,713,814
Patented July 26, 1955

2,713,814

AIRCRAFT CAMERA

Frederick Theodore Sonne, Golf, and Elmer J. Bury, Chicago, Ill., assignors to Chicago Aerial Survey Co., Chicago, Ill., a corporation of Illinois Application July 15, 1947, Serial No. 761,118

13 Claims. (Cl. 95—12.5)

This invention relates to a camera adapted to photograph ground terrain from an airplane in flight. More particularly, it relates to a camera having an intermittently activated exposure mechanism and in which a photographic film is continuously wound at a periodically varying rate past means for imaging a part of the terrain over which the airplane is flying, the rate of winding of the film when the exposure mechanism is operated being such that the movement of the film is synchronized with the displacement of the image which appears thereon. In addition, the rate at which the film is wound between activations of the exposure mechanism causes the film to move at a speed substantialy greater than the speed at which it moves when so synchronized with the image.

This invention also relates to a camera of the character described which has a new and improved type of platen which is adapted to move with the film during the time that the film is forced into intimate contact therewith, which condition exists at the time the exposure mechanism is operated.

The invention also relates to a new and improved camera of the character described which is adapted to be used both for daylight operation as well as for night operation.

Applicants are aware of the fact that other forms of automatic photographic apparatus particularly adapted to taking photographs from an airplane in flight have been developed which also utilize the moving film principle. One of these is a camera having a continuously moving film therein together with means for continuously imaging on a portion of the moving film a narrow strip of the terrain over which the plane is flying. Another of these is a camera having an intermittently activated exposure mechanism together with means for imaging a portion of the terrain over which the plane is flying on a portion of a continuously moving film. In this latter camera the speed of movement of the film may be adjusted to coincide with the speed of movement of the image, and the film moves continuously at that speed whether an exposure is actually being made or not. Applicants' device is believed to be a substantial improvement over this latter type of camera in which the rate of movement of the film between exposures is the same as the rate of movement necessary to synchronize the movement of the film with the displacement of the image. This limitation on the speed of the film between exposures is necessarily a very limiting factor since successive exposures cannot successfully be made more rapidly than at intervals separated by the time it takes to move the previously exposed portion of film out of association with the imaging means. Since the film moves constantly at the speed at which the image moves, this also means that by the time the film has been moved sufficiently to enable a new picture to be taken, the image has also moved sufficiently so that a completely new area of the terrain below is included in the image, assuming the course of the airplane is substantially a straight line.

It is therefore impossible with this type of camera to take successive pictures in which the area covered by each picture substantially overlaps the area covered by the immediately preceding picture. Since it is desirable in most mapping work in aerial photography to make successive exposures so that there is a 60% overlap in each successive picture, such a camera could not be utilized in this type of work. In addition, the limitation discussed above would prevent the taking of more than one picture of substantially the same area if the flight of the plane is in a straight line. The disadvantages of this limitation in military work, for instance, are obvious.

It is therefore an object of this invention to provide a camera of the character described above in which the movement of that portion of the film on which the image appears when the exposure mechanism is operated is synchronized with the displacement of the image appearing thereon.

It is a further object of this invention to provide a camera in which the movement of the film image is so synchronized, and in which the film is also continuously wound on a take-up spool at a constant speed, which speed is greater than the speed of the image appearing on the film.

Still another object of this invention is to provide a camera of the character described which also has incorporated therein a new and improved type of platen which substantially eliminates the danger of scratching the film even though the portion of the film on which the image appears is forced tightly against the platen while the film is moving.

Another object of this invention is to provide a camera of the character described which may be quickly and easily adapted for taking a series of pictures at relatively close intervals, such as in military night operation.

It is a further object of this invention to provide a camera of the character described which when set for normal daylight operation requires only one adjustment to be made to synchronize the movement of that portion of the film upon which the image appears with the movement of the image itself; which automatically makes exposures which have a predetermined fixed amount of overlap so long as the adjustment described has been made; which is of such simple construction that it may be easily adapted to various types of operation which may be selected at will; and which is extremely simple to operate since it requires a minimum amount of care and adjustment.

Further objects and advantages of this invention will become evident as the description proceeds, and from an examination of the accompanying drawing which illustrates several embodiments of the invention and in which similar numerals refer to similar parts throughout the several views.

In the drawings—

Fig. 1 is a partially diagrammatic view in elevation with parts broken away of an aerial camera embodying one form of the invention.

Fig. 2 is a partially diagrammatic view in elevation with parts broken away of the camera shown in Fig. 1, the view being taken looking toward the left side of the camera shown in Fig. 1.

Fig. 3 is a fragmentary view in side elevation of one of the cams and follower arms shown in Fig. 2, and associated parts.

Figure 4:
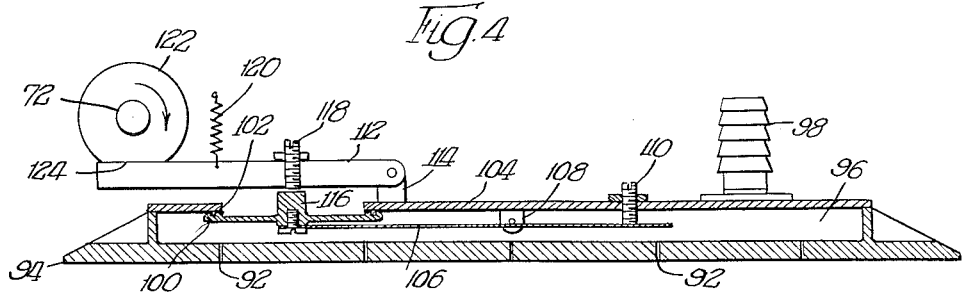
Fig. 4 is an enlarged elevation partly in cross-section of one form of platen which may be used with the camera shown in Fig. 1.

Referring now more in detail to Figures 1 and 2, the camera shown therein is designated generally by the numeral 10. The magazine portion 12 of the camera may have a generally rectangular shape, as shown, and be adapted to be secured to the camera cone assembly 14 in any conventional manner.

When the magazine portion 12 is so secured to the camera cone assembly 14 the platen 16 is in the focal plane of the lens assembly 196 contained in the cone assembly 14. The supply spool 18 and the take-up spool 20 are rotatably mounted between the supporting walls 22 and 24 in spaced relation to each other in the upper portion of the magazine 12. The idler roller 26 is likewise rotatably mounted between the supporting walls 22 and 24 adjacent to one end of the platen 16 in the lower part of the magazine 12. The shaft 27 supporting metering roller 28 is also rotatably mounted between these supporting walls adjacent to and above the opposite end of the platen 16.

The film timing roller 30 is provided on the shaft 32 which is rotatably mounted on the arms 34 and 36 adjacent their lower ends, which arms are, in turn, pivotally mounted at their opposite ends 35 and 37 to the external sides of walls 22 and 24. The walls 22 and 24 have the arcuate slots 38 and 40 therein through which the shaft 32 extends, the two slots being disposed to permit the film timing roller 30 to be swung toward or away from the platen 16 by pivoting the arms 34 and 36.

The pressure roller 42 is mounted on the arms 44 and 46 which are pivoted at their outer ends to the inside surface of the supporting walls 22 and 24 and are urged downwardly toward the metering roller 28 by resilient members such as the spring 48, shown in Fig. 1.

The shaft 27 which has the metering roller 28 mounted thereon also has worm gear 50 (Figure 2) mounted thereon which is adapted to mesh with the worm 52 on one end of the drive shaft 54. As shown in Fig. 1, a worm 56 is provided on the opposite end of the drive shaft 54 and is adapted to mesh with the worm gear 57 mounted on the shaft 58 of the variable speed drive 60. Rotation of the shaft 58 therefore results in a rotation of the drive shaft 54 which, in turn, causes the shaft 27 together with the metering roller 28 to also rotate. The speed of the variable speed drive 60 which is here represented as being an electric motor may be controlled by the rotation of the control shaft 62 which is adapted to cooperate with a rheostat control 64 which is in turn adapted to regulate the speed of the electric motor.

As shown in Fig. 1, the film 66 on the supply spool 18 is normally passed over the idler roller 26, across the platen 16, over the film timing roller 30, over the metering roller 28, between this latter roller and the pressure roller 42 and then onto the take-up spool 20. Because of this disposition of the film, a counterclockwise rotation of the metering roller 28, as viewed in Fig. 1, against which the film is pressed by the pressure roller 42 will cause the film to be drawn from the supply spool 18 across the platent 16. The take-up spool 20 is driven in a counterclockwise direction, as viewed in Fig. 1, to store the film so drawn across the platen 16. A slip clutch drive for this spool 20 may be utilized as illustrated in Figure 1 which provides for changing diameter of the spool as the film is wound thereon, in accordance with known practice. The spool can be driven by the same source of power as the metering roller 28 through the gears 192 and 194, as shown.

The gear 68 is also mounted on the shaft 27, as shown in Fig. 2, and is adapted to mesh with the gear 70 provided on the cam shaft 72 which is rotatably mounted between the supporting walls 22 and 24 and is journaled therethrough. The protruding ends of the shaft 72 have the cams 74 and 76 secured thereto. The follower arms 34 and 36 are pivoted at one end to the outer sides of the supporting walls 22 and 24, as described above, and are urged toward the cam shaft 72 by resilient members such as the spring 78, shown in Fig. 3. The follower rollers 80 and 82 are rotatably mounted on the outer surface of the two arms 34 and 36, respectively, and are adapted to bear against the cams 74 and 76 because of the action of the spring members such as the spring 78. This arrangement causes the film timing roller 30 to move in a manner determined by the shape and alignment of the two cams 74 and 76.

Figure 7:
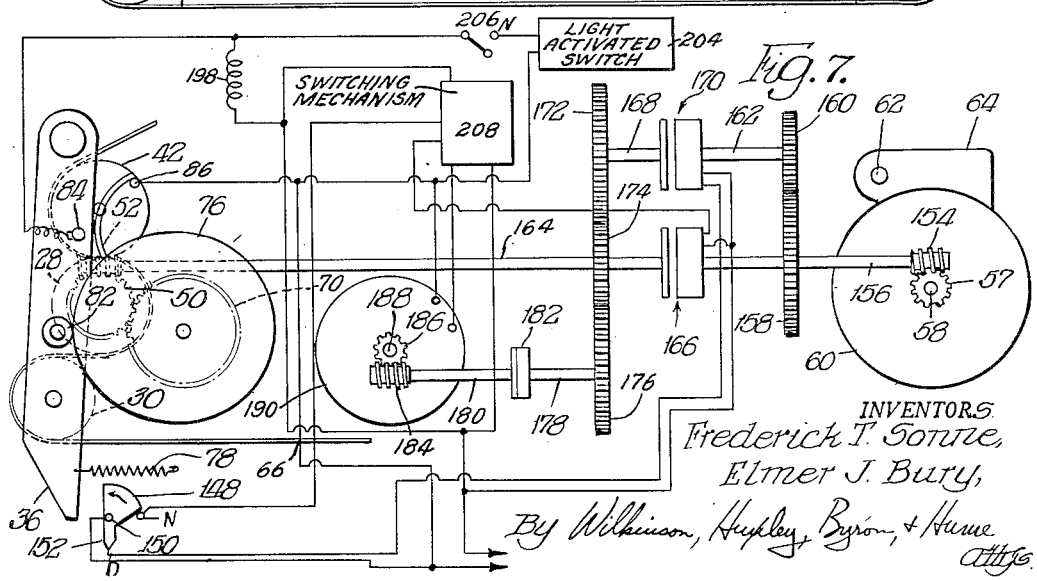
Fig. 7 is a partially diagrammatic view of a portion of a camera embodying an alternative form of the invention, the form shown being adapted to be used both for night operation as well as for daylight operation.

The arm 36, as shown in Fig. 3, also carries an electrical contact 84 which is adapted to make connection with the electrical contact 86 fixed to wall 24 when the arm 36 swings toward the latter contact. Making an electrical connection between these contacts in turn can be made to cause the exposure mechanism 198 in the camera cone assembly 14 to be operated. The exposure mechanism 198 may be provided with a solenoid which may in turn be connected to the line voltage through the conduits 200 and 202, which are connected respectively to the contacts 84 and 86, as shown in Figures 1, 2 and 7. The configuration of the cams 74 and 76 is such that at the time that the electrical connection is made between the contacts 84 and 86, the follower rollers 80 and 82 together with the arms 34 and 36 in which they are journaled are moving toward the cam shaft 72. Since the metering roller 28 is geared to the cam shaft 72, and since the metering roller is driven by the variable speed drive 60 through the shaft 54, the speed of rotation of the cams 74 and 76 is dependent upon the speed of rotation of the metering roller 28 which is, in turn, determined by the speed of the shaft 58 of the variable speed drive 60. Because of this relationship, the speed at which the pivot arms 34 and 36 will move toward the cam shaft 72 is directly proportional to the speed of the film 66 which is driven by the metering roller 28, the film being held against the latter by the pressure roller 42. Because of this construction, the film 66 may be wound between the pressure roller 42 and the metering roller 28 onto the take-up spool 20 at a constant speed while the portion of the film adjacent the platen 16 may be given a reduced speed at regular intervals by a movement of the film timing roller 30 generally toward the platen 16. If the film timing roller is moved toward the platen in a way which causes the speed of the film between the film timing roller 30 and the idler roller 26 to be reduced to a lower, but momentarily constant, speed, which speed is substantially the same as that at which an image on the portion of the film adjacent the platen 16 would move, it would be possible to move the film from the supply spool 18 to the take-up spool 20 at a constant speed which is greater than the speed of the image, and yet to have the movement of that portion of the film adjacent the platen synchronized with the movement of the image when the exposure mechanism is operated.

In order for the camera to operate properly, the speed of that portion of the film upon which the image appears during an exposure must equal the speed of the image. One method of accomplishing this, as mentioned above, is to move the film continuously from the supply spool to the take-up spool at a speed corresponding to the speed of the image. However, as previously pointed out, it would be desirable to be able to move the film between exposures at a greater speed than the speed of the image. In the present invention, therefore, the film is continuously moved from the supply spool to the take-up spool at a speed in excess of the speed of the image but the portion of the film upon which the image appears when the exposure mechanism is activated is slowed down during that time by a proper movement of the film timing roller 30, so that its movement is synchronized with the movement of the image during the exposure.

Since the speed of the image varies inversely with the altitude of the plane carrying the camera, and directly with the ground speed of the plane when it is flying on a straight-line course, such as is ordinarily utilized in aerial mapping work, means for adjusting the speed of that portion of the film on which the image appears to correspond to the speed of the image at various altitudes and ground speeds of the plane are necessary. In addition, it is desirable in this type of apparatus, as explained above, to have the ground area covered in each successive picture overlay the ground area covered in the preceding picture by a constant amount. This overlapping may be obtained by the proper regulation of the time which elapses between exposures in relation to the rate of displacement of the image. In the particular apparatus shown the amount of overlap in successive pictures is fixed at approximately 60%, which is the amount of overlap most commonly used in topographical work. Since the amount of overlapping is dependent upon the ratio between the winding speed of the film and the speed of that portion of the film upon which the image appears, which must be equal to the image speed at that time, a fixed ratio between these two speeds produces a substantially fixed amount of overlap.

Since the cams 74 and 76 are geared to the metering roller which drives the film itself, any increase in the winding speed of the film will also cause a corresponding increase in the speed of rotation of these cams. Therefore, if the cams are so designed as to cause the portion of the film upon which the image appears to move at a speed bearing a particular ratio to the winding speed of the film when the image does appear, this ratio will be substantially constant for any value of film winding speed.

Once this fixed ratio has been established the amount of overlap in successive pictures will also be substantially constant regardless of the particular film winding speed utilized, the later always being properly adjusted so that the speed of that portion of the film upon which the image appears is equal to the speed of the image. Because of the variations in the rate of movement of the film during exposure, together with variations of the time of exposure, slight variations in the length of the picture formed on the strip of film will occur. The variations in the dimensions of pictures taken at different film speeds and times of exposure will ordinarily be so small, however, that they may be neglected. In the usual embodiment of the invention shown in the drawings, for example, the time of exposure may be varied from 1/100 of a second to 1/800 of a second. The maximum speed of the strip of film during an exposure is 7.2 inches per second. Since the slowest exposure time is 1/100 of a second and since the upper limit of speed of the film is 7.2 inches per second, the maximum distance that the film will move during the slowest exposure time is .072 inch.

Assuming that the slowest speed of the film and the fastest exposure time combine to produce substantially no movement of the film in the time of exposure, the greatest variation between pictures with regard to dimension in the direction which the strip of film moves would be close to .072 inch. This variation is almost negligible when compared with the normal dimension of the film in this direction which is nine inches. We will therefore neglect this variation in our discussion of the operation of the camera.

With regard to the possible variation in the amount of overlap in successive pictures due to this characteristic, the mechanism can be so designed that the 60% overlap will occur when the pictures are taken at the fastest exposure time and the slowest speed of the film. Slight variations due to adjustments in these two factors will then tend to produce only a very slight increase in the percentage of overlap.

In a camera having the construction described above, an adjustment of the winding speed of the film will cause the period between exposures to vary and will also cause the speed of that portion of the film adjacent the platen when the film timing roller 30 is moved to vary. Since both the time between exposures and the speed of the image are functions of the altitude and the ground speed of the plane carrying the camera, and since, as the speed of the image increases, the time between exposures decreases, and likewise, as the speed of the image decreases, the time between exposures increases, an adjustment in the winding speed of the film can be made to synchronize the movement of that portion of the film adjacent the platen with that of the image when the exposure mechanism is activated, which adjustment will at the same time permit the proper amount of time to elapse between exposures to obtain the desired amount of overlap.

By way of explanation of the relationship between the winding speed of the film, the speed of the operation of the film upon which the image appears and the overlapping desired in successive exposures, the following specific example may be helpful. Assume that the dimension of the image along the line of movement of the film is 9 inches, as it appears on the film, and that it is desirable to have a one-half inch spacing between pictures. Also assume that it is desirable to have an overlap of 60% in successive pictures, that is, each succeeding picture will include 60% of the area included by the picture immediately preceding it. In order to have such overlapping, in the time between exposures the film must be moved 9.5 inches and the image must have moved only 40% of the length of a picture, namely, 3.6 inches. If the image has so moved, the next succeeding picture will include 60% of the area included in the last picture, plus 40% additional area.

In other words, this means that the film must be wound at a speed of 9.5 inches in the time between exposures, which time we shall designate T. The speed of movement of the image must therefore be 3.6 inches in the time T if there is to be a 60% overlap since 3.6 is 40% of 9 inches. Since T is always the same for both the film and the image, the ratio between the winding speed of the film and the speed of that portion of the film upon which the image appears, which must equal the image speed, must therefore be in ratio of 9.5 to 3.6 or, in other words, 2.64 to 1, regardless of the value of T. This ratio is fixed for the particular dimension that we have assumed for the pictures, and the cams 74 and 76 must therefore be so designed as to produce such a fixed ratio between the winding speed of the film and the speed of that portion of the film upon which the image appears at the time an exposure is made. Since the winding speed of the film can be set at any desired value, it can be adjusted so that the speed of that portion of the film upon which the image appears at the time the exposure is made is equal to the speed of the image, the latter being dependent upon the altitude and ground speed of the plane. Since the ratio between the winding speed of the film and the speed of the portion of the film upon which the image appears is fixed regardless of the value of the winding speed, the predetermined amount of overlapping will occur regardless of the value of the winding speed, which speed is always determined by the speed of the image.

Fig. 3 illustrates the approximate configuration necessary for the cams 74 and 76 in order for the film timing roller 26 to be moved in such a way that the speed of the film between that roller and the idler roller 26 is substantially constant for a short period when the follower roller 82 is moving from the point 88 to the point 90 on the cam 76. If the film timing roller 30 were moved at a constant speed precisely along the line of movement of the portion of the film 66 adjacent the platen 16, then that portion of the film would move at a constant reduced speed. Since the roller 30 is not moved precisely along the line of movement indicated, when the arms 34 and 36 are pivoted, but is moved in an arcuate path substantially tangent to that line of movement, the rate of movement of the roller produced by the configuration of the cams 74 and 76 must be varied, rather than constant, so as to cause the portion of the film adjacent the platen to move momentarily at a constant, reduced speed.

Because of these characteristics a camera embodying this invention requires only one adjustment to prepare the camera for operation at a particular altitude and ground speed. As explained above, this adjustment may be made through rotation of the speed control shaft 62, which in turn controls the speed of the variable speed drive 60 through the rheostat 64. A suitable computer may be utilized to obtain the proper setting for the speed control shaft 62 from the appropriate values of the altitude and ground speed of the airplane. This of course greatly simplifies the operation of a camera of this type and also eliminates the necessity of using an intervalometer.

As mentioned above, a new and improved type of platen which is adapted to move with the film during the time that the film is forced into intimate contact therewith is also a part of this invention. As shown in Fig. 4 the platen to be used in the camera embodying the form of the invention shown in Figures 1 and 2 may be of a vacuum operated construction having the ports 92 extending through the vacuum plate 94 which forms the face of the platen. The main body of the platen has a chamber 96 formed therein into which the nipple 98 extends, the nipple being adapted to receive a vacuum hose. The ports 92 also open into this chamber 96 and the valve 100 is adapted to enclose the opening 102 in the plate 104 forming the back of platen. The valve 100 is mounted on the spring arm 106 which is pivoted on the pivot post 108 secured to the plate 104 within the chamber 96. The adjusting screw 110 is adapted to be threaded through the plate 104 so that it extends into the chamber 96 and bears against the end of the spring arm 106 opposite to the end carrying the valve 100. By adjusting the position of the adjusting screw 110 the pressure applied to the valve 100 by the spring arm 106 may be set to any desired amount.

If a vacuum hose is connected to the nipple 98 air will be withdrawn from the chamber 96 and atmospheric pressure will force air through the ports 92 into the chamber 96. If the pressure within the chamber 96 falls below a point at which the pressure of the atmospheric air against the valve 100 is greater than the opposing pressure on the valve produced by the spring arm 106, the valve will open and allow air to enter the chamber 96 through the opening 102. This is a safety valve arrangement to prevent damage to the film. The arm 112 is pivoted at one end on the pivot post 114 secured to the plate 104 and extends across the center 116 of the valve 100. The adjusting screw 118 is threaded through the arm 112 in such a fashion that it is adapted to bear against the center 116 of the valve 100 when it protrudes from the arm 112. The spring member 120 normally maintains the arm 112 in bearing relationship against the cam 122. The cam 122 is substantially circular but has a flattened portion 124. When the arm 112 bears against the circular portion of the cam 122 the valve 100 is held in an open position by the adjusting screw 118. However, when the arm 112 is adjacent the flattened portion 124 of the cam 122, the adjusting screw 118 is out of contact with the center 116 of the valve 100. Thus the valve 100 is closed for a short period during each complete revolution of the cam 122.

Cam 122 is mounted on the cam shaft 72 and is so aligned with the cams 74 and 76 that the valve 100 is closed at the moment the contact points 84 and 86, as described above, are closed. When the valve 100 is closed and a vacuum tube is connected to the nipple 98 air will be drawn into the chamber 96 through the ports 92. Since the closing of the valve 100 is synchronized with the activation of the exposure mechanism, this air will be drawn through the ports 92 at the time when the exposure mechanism is in operation. Since the film 66 normally passes across the vacuum plate 94 forming the face of the platen, the drawing of air through the ports 92 into the chamber 96 will cause the film to be forced tightly against the plate 94. This insures that the film adjacent the platen is in a perfectly flat condition when the valve 100 is closed and a vacuum is being drawn through the nipple 98, which period may be synchronized with the operation of the exposure mechanism by a proper alignment of cam 114 with cams 74 and 76.

Figure 5:
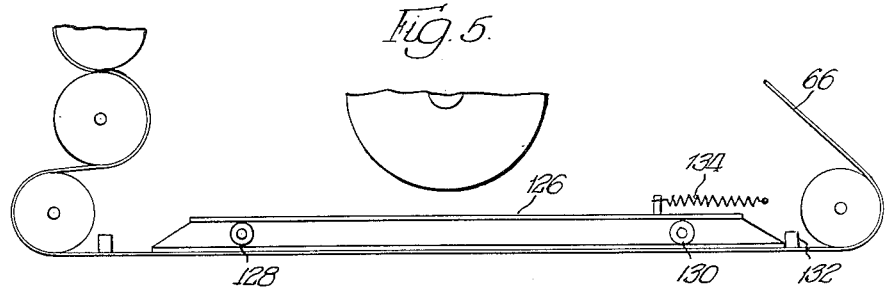
Fig. 5 is an enlarged partially diagrammatic view in elevation of a form of platen adapted to move with the film passing thereover during the time that an exposure is being made.

Since the pressing of the film against the vacuum plate 94 of the platen combined with the normal movement of the film across the plate, has a tendency to produce scratching of the film, it would be desirable to incorporate means for preventing such disfiguration. One form of such a means is shown in Fig. 5 in which the platen 126 is mounted to move along the line of movement of the film 66 on the rollers 128 and 130. The platen 126 is normally held against the stop 132 by the spring member 134. When the air is sucked through the ports on the face of the platen and the film is drawn tightly against that face, the film is momentarily frictionally bound to the face of the platen in a way which enables the film 66 to overcome the tension of the spring member 134 and to move the platen with the film in the direction of its movement. After the exposure has been made and the chamber within the platen is returned to atmospheric pressure by the opening of the control valve, the frictional tie between the film and platen is broken so that the spring member 134 will cause the platen 126 to quickly return to its original position against the stop 132.

Figure 6:
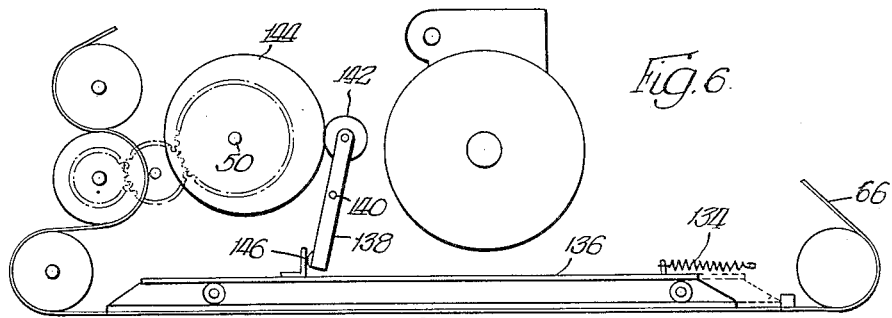
Fig. 6 is an enlarged partially diagrammatic view in elevation of an alternate form of platen adapted to move with the film passing thereover during the time that an exposure is being made.

An alternative form of such a platen designed to move with the film when it is pressed against the platen is shown in Fig. 6. In this embodiment the platen 136 is of the same general construction as that shown in Fig. 5 with the exception that the pivot arm 138 is mounted on the pivot 140 in such a way that the roller 142 carried on one end of the arm 138 bears against the cam 144 mounted on the cam shaft 72. The opposite end of the pivot arm 138 is adapted to bear against the lug 146 mounted on the back of the platen 136. The cam 144 is so positioned relative to the cams 74 and 76 that the pivot arm 138 is caused to bear against the lug 146 and it therefore causes the platen 136 to move in the direction of movement of the film 66 at the time that the contact points 84 and 86 are closed. The platen 136 is therefore moved not only by the film 66 when it is frictionally bound thereto but also by the action of the pivot arm 138 which is adapted to cooperate with the cam 144.

As previously mentioned, the type of apparatus described above may be easily adapted for use in a camera which may also have apparatus incorporated therein which permits the taking of pictures over a range of intervals, when desired, rather than only at regular intervals such as is the case when a fixed amount of overlap is desired.

One form of such an adaptation is shown in Fig. 7. The adaptation is made primarily in connection with the driving mechanism between the worm gear 50 and the worm gear 56 (Figures 1 and 2). A control member 148 in the form of a segmental cam mounted on the rotatable shaft 150 is also disposed adjacent the follower arm 36 so that when the cam is rotated into engagement with the follower arm, the follower roller 82 on the arm will be disengaged from the cam 76. The control member 148 is provided with the pointer arm 152 which is adapted to indicate the operative and non-operative settings of the control member, which are here designated by the letters "D" and "N", representing, in this particular case, the settings for daylight operation and for night operation, respectively.

In this modification, the gearing clutching arrangement, as shown in Fig. 7, is substituted in place of the drive shaft 54, shown in Figs. 1 and 2. The worm 154 carried by the shaft 156 is adapted to mesh with the worm gear 57 on the shaft 58 of the variable speed drive 60. The gear 158 is also mounted on the shaft 156 and is adapted to mesh with the gear 160 carried by the shaft 162. The shaft 156 is adapted to be joined at will to the shaft 164 by engaging the clutch 166. Likewise the shaft 162 is adapted to be joined at will to the shaft 168 by engaging the clutch 170. The gear 172 is mounted on the shaft 168 and is adapted to mesh with the gear 174 mounted on the shaft 164. The gear 174 is, in turn, adapted to mesh with the gear 176 mounted on the shaft 178. The shaft 178 is adapted to cooperate with the shaft 180 through the one-way clutch 182, the clutch being so constructed that when the shaft 180 is rotated the shaft 178 will rotate, but if the shaft 178 is independently rotated it will have no effect on the shaft 180. The shaft 180 has the worm 184 mounted thereon which is adapted to mesh with the worm gear 186 mounted on the shaft 188 driven by the electric motor 190.

From this arrangement it will be seen that the shaft 164 may be rotated by the variable speed drive 60 through the gear train made up of the gears 158 and 160, the clutch 170 and the gears 172 and 174, or through the clutch 166 alone. It also may be rotated by the electric motor 190 through the clutch 182 and the gears 176 and 174. Proper selection of these various methods of rotation of the shaft 164 together with a proper setting of the control member 148 enables the mechanism to be utilized for various methods of operation. For example, when the control member 148 is set at "D" and is therefore not engaged with the follower arm 136, and the clutch 170 is engaged, while the clutch 166 is disengaged, the shaft 164 will be rotated by the variable speed drive 60 through the gear train associated with the clutch 170. When such adjustments have been made to the control member 148 and the clutches 166 and 170, the apparatus will operate in substantially the same fashion as that shown in Figures 1, 2, and 3, providing appropriate adjustments are made to the speed control shaft 62 to correspond with the particular altitude and ground speed of the airplane carrying the camera.

As shown in the wiring diagram incorporated in Figure 7, one side of the line voltage is connected to the control member 148. Therefore when the member 148 is in the "D" position, that side of the line is connected to the contact member "D." This contact member is in turn connected to the clutch 170. The clutch 170 is also connected to the other side of the line voltage. Therefore when the control member 148 is set, as shown in Figure 7, the clutch member 170 is engaged and the shaft 164 will be driven therethrough by the variable speed drive 60, which is also connected to the line voltage as indicated. The switch member 206 is also open, in the position shown in Figure 7 for daylight operation, so that the photo-electric cell or light-activated switch member 204 is disconnected from the circuit and the solenoid of the shutter mechanism 198 is capable of being activated only by closing the switch elements 84 and 86. As indicated, the contact member 86 is connected to one side of the line and the contact member 84 is connected to the solenoid of the shutter mechanism 198, and the solenoid in turn is connected to the other side of the line voltage.

On the other hand, when the control member 148 is set at "N" the follower roller 82 is disengaged from the cam 76 so that the axis of the film timing roller 30 maintains a fixed position. No variation in the speed of the film 66 will therefore be imparted by the shifting of the film timing roller 30 to give the film 66 the proper reduced speed during the time an exposure is being made. When the control member 148 is so adjusted the winding of the film and the synchronization of that portion of the film upon which the image appears with the moving image must therefore be carried out by other means than those utilized when the control member is set at "D" as described above.

During the time between exposures the clutches 166 and 170 are initially both disengaged and the electric motor 190 is energized by a suitable switching mechanism 208 for a time sufficient to cause the metering roller to wind the appropriate amount of film to give the desired spacing between pictures. The motor 190 is then de-energized by the switching mechanism 208 and the clutch 166 is immediately engaged. The metering roller 28 is then driven directly by the variable speed drive 60 through the shafts 156 and 164 and the simultaneous rotation of the shaft 178, through the gear train 174 and 176, has no effect on the shaft 180 since the clutch 182 has a one-way characteristic, as described above.

More specifically, when the control member 148 is in the "N" position, one side of the line voltage is connected to the contact member "N," which is in turn connected to the clutch member 166. The other side of the clutch member 166 is connected to the other side of the line voltage. In addition, the switch member 206 is closed in the "N" position so that one side of the light-activated switch member 204 is connected to the contact member 84, the switching mechanism 208, and the solenoid of the exposure mechanism 198.

Thus when the control member 148 is in the "N" position, clutch 166 is normally activated and serves to drive the film at a constant speed which may be synchronized with the moving image.

The light-activated switch 204 is provided to activate the exposure mechanism so that the exposures may be made by dropping suitable flares or the like. Momentary activation of the switch member 204 by a flash of light will activate the solenoid of the shutter mechanism 198, since the switch member 206 is closed, and cause the film to be exposed. Simultaneously the switching mechanism 208 will be activated by the momentary closing of switch 204.

When the switching mechanism 208 is thus activated it permits current to flow to the motor 190 immediately after the exposure of the film only for a period long enough to allow sufficient film to be recycled so that an unexposed portion will be available for the succeeding exposure. When the motor 190 is energized the switching mechanism 208 may de-energize the clutch member 166 as previously stated. Likewise when the motor 190 is de-energized the switching mechanism 208 will cause the clutch member 166 to be immediately engaged. This, of course, is only one method of activating the exposure mechanism. It might be desirable to have a manually operated control for that purpose which would enable exposures to be made at any desired intervals when the control member 148 is set at "N." The minimum interval at which exposures may be taken, however, when the camera is so adjusted is established by the time which elapses between the completion of an exposure, the disengagement of the clutch 166, the energizing of the motor 190 and the reengagement of the clutch 166. This interval may of course be made relatively short if such adjustments are all caused to be carried out automatically, and if the film is wound at considerable speed between exposures.

By way of further explanation of the gearing arrangement, shown in Fig. 7, the gear train composed of the gears 158 and 160, the clutch 170 and the gears 172 and 174 may be so designed that the same setting for the speed control shaft 62 for a particular altitude and ground speed of the airplane will be satisfactory for both types of operation. This means that the winding speed of the film, when the control member 148 is set at "D" and the speed control shaft 62 is set for the proper altitude and ground speed, it always such that the reduced speed of that portion of the film upon which the image appears during the exposure is equal to the image speed. Likewise, the winding speed of the film, when the control member 148 is set at "N" and during the time the exposure mechanism is activated, is always the same as the speed of the image at the particular altitude and ground speed for which the speed control shaft 62 is set.

In other words, a particular setting of the control shaft 62 will give the variable speed drive 60 a speed of rotation which, when transmitted directly to the metering roller 28 through the gear 57, worm 154, shaft 156, clutch 166, shaft 164, worm 52, and gear 50, will give the film 66 a particular winding speed which will, in turn, cause the film timing roller to operate properly so that the portion of the film adjacent the platen is synchronized with the moving image formed thereon when the exposure mechanism is operated as described above. At the same time, if this same speed of rotation of the variable speed drive 60 is transmitted through the gear 57, worm 154, gears 158 and 160, shaft 162, clutch 170, shaft 168, gear 172, gear 174, shaft 164, worm 52, and gear 50, the metering roller 28 will give the film a winding speed which is equal to the speed of the image that will appear on the film when the exposure mechanism is operated.

The adaptation shown in Fig. 7 is, of course, only one example of the way in which the embodiment of the invention shown in Figures 1, 2 and 3 may be combined with other forms of apparatus to give a combination of types of performance never before achieved in one instrument. Other adaptations could be readily devised to satisfy the need for a camera capable of performing other types of specialized work.

The drawings and the above description are therefore not intended to represent the only possible forms of this invention, in regard to details of construction. Changes in form and in the proportion of parts, as well as the substitution of equivalents are contemplated, as circumstances may suggest or render expedient. Although specific terms are employed, they are used in a generic and descriptive sense only, and not for purposes of limitation, the scope of the invention being defined in the following claims.

We claim:

1. In a camera of the character described the combination of an objective, a shutter, a movable platen in the focal plane of the camera, a film-driving roller adapted to normally draw said film across said platen, a shiftable idler roller disposed adjacent said platen around which said film passes when moving between said platen and said driving roller, cam means for normally periodically shifting said idler roller and said platen simultaneously so that the speed of movement of the portion of said film adjacent said platen is altered and said platen is momentarily moved in synchronism with and in the same direction as said portion of said film, means activated by the shifting of said idler roller for simultaneously operating said shutter, and means for rotating said film-driving roller at an adjustable uniform speed, said last named means also activating said cam means.

2. In a camera of the character described the combination of an objective, a shutter, a movable platen in the focal plane for the camera, a film-driving roller adapted to normally draw said film across said platen, a shiftable idler roller disposed adjacent said platen around which said film passes when moving between said platen and said driving roller, cam means for normally periodically shifting said idler roller and said platen simultaneously so that the speed of movement of the portion of said film adjacent said platen is altered and said platen is momentarily moved in synchronism with and in the same direction as said portion of said film, means activated by the shifting of said idler roller for simultaneously operating said shutter, a prime mover for normally rotating said film-driving roller and said cam means at an adjustable uniform speed, and means for adjusting the speed for said prime mover at will so that the speed of movement of said portion of film adjacent said platen when said shutter is operated is substantially the same as the speed of movement of the image formed on said film.

3. A combination of the character described in claim 2 further comprising means for making inoperative at will said cam means, means for simultaneously reducing the normal speed of said film-driving roller when said last named means is activated so that said film normally is driven at a speed coresponding to the speed at which that portion of the film adjacent said platen would move when said shutter is activated if said cam means were still operative, this reduction in film speed occurring independently of said means for adjusting the speed of said prime mover, and means for recycling said film after each activation of said shutter.

4. In an aircraft camera having an objective, a shutter mechanism, and a focal plane, a film magazine comprising a combination of a housing adapted to be secured to said camera, a movable platen disposed in said housing so as to be in the focal plane of the camera, a film-driving roller adapted to normally draw said film across said platen, a shiftable idler roller disposed adjacent said platen around which said film passes when moving between said platen and said driving roller, cam means for normally periodically shifting said idler roller and said platen simultaneously so that the speed of movement of the portion of said film adjacent said platen is altered and said platen is momentarily moved in synchronism with and in the same direction as said portion of said film, means activated by said cam means for simultaneously operating said shutter, a prime mover, alternative driving means capable of being selectively coupled between said prime mover and said driving roller, a second prime mover, an additional driving means continuously coupled to said second prime mover and said driving roller, and means for adjusting the speed of said first named prime mover.

5. In an aircraft camera having an objective, a shutter mechanism, and a focal plane, a film magazine of the character described in claim 4 further comprising means for making inoperative at will the cam means for shifting said idler roller, means for simultaneously coupling said first named prime mover to said driving roller through the previously inoperative alternative driving means, said last named driving means being so designed that said film is then driven at a speed and direction corresponding to the speed and direction at which that portion of the film adjacent said platen would move when said shutter is activated if said cam means for shifting said driving roller were still operative and activated by said previously operative alternative driving means.

6. In an aircraft camera having an objective, a shutter mechanism, and a focal plane, a film magazine comprising a combination of a housing adapted to be secured to said camera, a movable platen disposed in said housing so as to be in the focal plane of said camera when said magazine is secured thereto, a film driving member adapted to normally draw said film across said platen, means for causing said platen to move in the same direction as the image formed by said camera, a prime mover adapted to drive said film driving member and said means for moving said platen, means for adjusting the speed of said prime mover at will so that said platen is moved in synchronism with the image formed by said camera, a transversely shiftable idler roller around which said film normally passes after having been drawn across said platen, means operated by said prime mover for periodically shifting said idler roller in a direction which decreases the speed of the portion of film adjacent said platen when said platen is so moved in synchronism with said image, means for securing said film momentarily to said platen when said platen is moving in synchronism with said image, and control means activated by said prime mover adapted to be operably connected to said shutter mechanism to operate the latter when the speed of the portion of film adjacent said platen is decreasd.

7. In an aircraft camera having an objective, a shutter mechanism and a focal plane a film magazine comprising a housing adapted to be secured to said camera, a prime mover, a shiftable platen disposed in said housing so as to be in the focal plane of said camera when said housing is secured thereto, a shiftable idler roller disposed adjacent said platen, cam means activated by said prime mover for normally periodically shifting said idler roller and said platen simultaneously so that the length of film between said platen and said film driving roller is periodically increased and decreased and said platen is shifted when said film length is decreased in the direction in which said film is moving, so that said platen is momentarily moved in synchronism with said film, means for adjusting the speed of said prime mover at will so that the speed of movement of the portion of said film adjacent said platen when moving in synchronism therewith is substantially the same as the speed of movement of the image formed by said camera in the focal plane thereof, and control means activated by said prime mover adapted to be operably connected to said shutter mechanism to operate the latter when the speed of said film is substantially the same as the speed of said image.

8. In a camera of the character described the combination of an objective, a shutter, a movable platen in the focal plane of the camera, a film-driving roller adapted to normally draw said film across said platen, means for rotating said film-driving roller at an adjustable uniform speed, a shiftable idler roller around which said film normally passes after having moved across said platen, a pair of pivoted supporting arms rotatably supporting said idler roller, a cam means adapted to cooperate with said arms to periodically shift said idler roller, and a second cam means adapted to periodically move said movable platen, both said cam means being activated by said means for rotating said film-driving roller, said cams also being of such a configuration that the transverse shifting movement of said idler roller causes the portion of said film adjacent said platen to move at periodic intervals at a predetermined speed which speed bears a fixed relation to the speed at which said film is driven, and said platen is caused to periodically move at substantially the same speed, and in substantially the same direction, as the portion of said film adjacent said platen.

9. The combination of the character described in claim 8 also comprising means for selectively adjusting at will the normal speed of said means for driving said film-driving roller so that said platen and the portion of said film adjacent said platen will simultaneously move at a speed substantially the same as the rate of displacement of the image which appears thereon when said shutter is activated.

10. The combination of the character described in claim 9, further comprising means for periodically activating said shutter at a particular point in the cycle of shifting movement of said idler roller, the speed of rotation of said cam means controlling the shifting movement of said idler roller bearing a fixed relation to the speed of rotation of said film-driving roller so that the amount of film driven by said film-driving roller between successive activations of said shutter is substantially constant and of a magnitude such that there is a substantial overlapping of the area of terrain included in successive images.

11. In a camera of the character described the combination of an objective, a shutter, a movable platen in the focal plane of the camera, a film-driving roller adapted to normally draw said film across said platen, means for rotating said film-driving roller at an adjustable uniform speed, a shiftable idler roller around which said film normally passes after having moved across said platen, a pair of pivoted supporting arms rotatably supporting said idler roller, a cam means adapted to cooperate with said arms to periodically shift said idler roller, and a second cam means adapted to periodically move said movable platen, both said cam means being activated by said means for rotating said film-driving roller, said first named cam means periodically shifting said idler roller in a direction which affects the length of the portion of said film between said idler roller and said platen and thus periodically altering the speed of that portion of said film moving across said platen, and said second cam means simultaneously shifting said platen so that said platen is momentarily moved in synchronism with the portion of said film adjacent said platen.

12. In a camera of the character described the combination of an objective, a shutter, a movable platen in the focal plane of the camera across which photographic film may normally be continuously moved, means for periodically activating said shutter to form an image on the portion of said film adjacent said platen at regular predetermined intervals, means for forcing said film tightly against said platen at intervals coincident with the forming of said image, cam means causing said plates to move in synchronism with said film when said film is so forced against said platen, a shiftable idler roller around which said film normally passes after having moved across said platen, a film-driving roller adapted to normally draw said film across said platen, means rotated by said last named means for rotating said film-driving roller at an adjustable uniform speed, a second cam means for activating said first named means and for normally periodically shifting said idler roller in a direction which affects the length of film between said film-driving roller and said platen so that the speed of movement of the portion of film adjacent said platen is periodically altered, both of said cam means being activated by said means for rotating said film-driving roller and being of such a configuration that the movement of said platen and said film is synchronized when said second named means is activated.

13. A combination of the character described in claim 12 also comprising means for making said second cam means inoperative at will, means for simultaneously reducing the normal speed of said film-driving roller when said shutter is activated so that said film is driven at a speed corresponding to the speed at which the portion of film adjacent said platen would move when said shutter is activated if said second cam means were still operative, and means for recycling said film after each activation of said shutter.

References Cited in the file of this patent

UNITED STATES PATENTS

| | | |
|---|---|---|
| 1,413,187 | Paumier | Apr. 18, 1922 |
| 1,586,071 | Cooke | May 25, 1926 |
| 2,144,088 | Scott | Jan. 17, 1939 |
| 2,333,768 | Davies et al. | Nov. 9, 1943 |
| 2,424,989 | Koepfer | Aug. 5, 1947 |
| 2,474,323 | Rattray | June 28, 1948 |

FOREIGN PATENTS

| | | |
|---|---|---|
| 461,106 | France | Oct. 22, 1913 |